United States Patent [19]
Menard et al.

[11] Patent Number: 5,915,401
[45] Date of Patent: Jun. 29, 1999

[54] SERVOCONTROL PROCESS FOR A SERVOVALVE WHICH CAN BE SERVOCONTROLLED IN TERMS OF FLOW RATE AND PRESSURE

[75] Inventors: Christian Menard, Villennes sur Seine; Patrick Lorinet, Paris; Philippe Chabbert, Rueil Malmaison, all of France

[73] Assignee: Thomson-CSF, Paris, France

[21] Appl. No.: 09/029,252

[22] PCT Filed: Sep. 6, 1996

[86] PCT No.: PCT/FR96/01374

§ 371 Date: Mar. 5, 1998

§ 102(e) Date: Mar. 5, 1998

[87] PCT Pub. No.: WO97/09663

PCT Pub. Date: Mar. 13, 1997

[30] Foreign Application Priority Data

Sep. 8, 1995 [FR] France .................................. 95 10535

[51] Int. Cl.⁶ ..................................................... F16K 31/04
[52] U.S. Cl. ........................................... 137/12; 137/487.5
[58] Field of Search ..................................... 137/12, 487.5

[56] References Cited

U.S. PATENT DOCUMENTS

| | | |
|---|---|---|
| 2,948,295 | 8/1960 | Smith ..................................... 137/487.5 |
| 3,402,972 | 9/1968 | Cooper et al. .................. 137/487.5 X |
| 3,552,428 | 1/1971 | Pemberton ........................ 137/487.5 X |
| 4,059,128 | 11/1977 | Heske et al. .......................... 137/487.5 |
| 4,142,489 | 3/1979 | Menard . |
| 4,250,846 | 2/1981 | Menard . |
| 4,313,414 | 2/1982 | Planteline . |
| 4,352,345 | 10/1982 | Menard et al. . |
| 4,417,312 | 11/1983 | Cronin et al. ..................... 137/487.5 X |
| 4,961,441 | 10/1990 | Salter ................................ 137/487.5 X |
| 5,297,987 | 3/1994 | Emmons et al. . |
| 5,302,009 | 4/1994 | Menard . |
| 5,409,302 | 4/1995 | Chabbert . |
| 5,438,909 | 8/1995 | Menard . |
| 5,587,660 | 12/1996 | Chabbert et al. . |
| 5,608,325 | 3/1997 | Chabbert et al. . |
| 5,611,518 | 3/1997 | Menard . |
| 5,644,209 | 7/1997 | Chabbert et al. . |

*Primary Examiner*—Denise L. Ferensic
*Assistant Examiner*—Ramyar Farid
*Attorney, Agent, or Firm*—Oblon, Spivak, McClelland, Maier & Neustadt, P.C.

[57] ABSTRACT

A process for automatically controlling a hydraulic servovalve with a hydraulic slide valve displaced by a rotary actuator. The process includes a first loop for automatically controlling the delivery as a function of the measurement of the angular position of the rotary actuator and a second automatic control loop with variable control as a function of the pressure measurement. The first automatic control loop is a proportional action loop whose increase is constant for the absolute values of the pressure deviation which are less than at least a threshold value and then varies in an increasing manner for absolute values of the pressure deviation which are greater than the same threshold.

20 Claims, 4 Drawing Sheets

SERVOCONTROL PROCESS FOR A SERVOVALVE WHICH CAN BE SERVOCONTROLLED IN TERMS OF FLOW RATE AND PRESSURE

BACKGROUND OF THE INVENTION

1. Field of the Invention

The present invention relates to a servocontrol process for a servovalve which can be servocontrolled in terms of flow rate or pressure. It applies in particular to hydraulic servovalves used in vehicle automatic braking or guidance systems.

2. Discussion of the Background

Such servovalves include a hydraulic slide provided with return means and moved by a rotary actuator such as an electric motor; the return means keep the slide in a neutral position from which the slide can be translated in two opposite directions so as to obtain two working positions, corresponding for example to the pressurizing or venting to tank of the circuit.

Such servovalves include two servocontrol loops: one, which is called the flow rate control loop, cuts in when the servovalve is intended to meter a flow rate and the other, which is called the pressure loop, cuts in when the servovalve is intended to control a pressure inside a volume, a brake, a jack, etc.

Such servovalves are described in particular in French Patent Application No. 92 02843 of Mar. 10, 1992 and No. 94 07571 of Jun. 21, 1994 from the Applicant.

In this autosystem, the loops employ: a sensor which measures the position of the motor linked to the slide of the servovalve, in the case of flow rate servocontrol; one or two pressure sensors which measure the pressure in one or two volumes, in the case of pressure servocontrol. The measurements are compared with position set-points for the flow rate loop and pressure set-points for the pressure loop or loops.

In order to deal with the matter optimally, that is to say by effecting a compromise between gain, phase and stability of the servocontrols, use is made of the knowhow from techniques in the field of automation, generally relating to servocontrol loops, in which PID (Proportional Integral Derivative) functions are employed: linear type processing.

In the case of the control of servovalve loops, the use of a proportional derivative control is not always obvious. The reason for this is that for small signals it would be necessary for the loops to have a first gain and, for large signals, another gain. A particular difficulty is then faced, namely of adding a particular type of control command to the linear type controls.

The mechanical elements which prompt particular consideration of control command are linked with the jet effect, and also with the fact that the electric control motor possesses considerable self-inductance and also inertia; this is due to the power which it must develop in order to counter the forces generated by the jet effect.

Moreover, when it is necessary to work on considerable signal deviations, the regulating loops determine power control levels for the motor which are insufficient for the optimal speeds to be obtained under transient conditions. In this case it is therefore necessary to append a state control module which determines the current to be applied to the motor and, consequently, the torque to be imposed on the motor. Control of the power is carried out in that portion of the hardware consisting of the transistor bridge controlling the motor and the duty ratio for the control of this bridge. The duty ratio varies in relation to the software which imposes the state control.

When the slide is actuated, for example from its position of venting to tank, to its position of pressurization, it traverses a dead zone for which there is no link in the circuits to be controlled and, consequently, no action of the hydraulic circuit takes place. This dead zone causes a hysteresis which reduces performance especially in the case of the actuation of devices such as brakes.

SUMMARY OF THE INVENTION

The objective of the invention is to overcome the aforesaid drawbacks, especially to improve the speed of response of the servovalve in transient situations and to eliminate the drawbacks due to the crossing of the dead zone.

To this end, the subject of the invention is a servocontrol process for a servovalve comprising a slide provided with return means and moved by a rotary actuator such as an electric motor, the servocontrol device comprising two nested loops, a first loop for servocontrolling the flow rate as a function of the measurement of the angular position of the rotary actuator and a second servocontrol loop with variable control of the pressure as a function of the measurement of the pressure, characterized in that the first servocontrol loop is a proportional action loop whose gain is constant for values of the absolute value of the pressure deviation which are less than at least one threshold value and then varies in an increasing manner for the values of the absolute value of the pressure deviation which are greater than the said first threshold.

According to another characteristic of the invention, in the case of pressure servocontrol, the value of the gain ($K_{pa}$) is an increasing function of the capacity of the volume of the chamber whose pressure is to be controlled, the difference between the gains for two given volumes being constant as the pressure deviation varies.

According to yet another characteristic of the invention, in the case of pressure servocontrol, for increasing values of the position ($x_r$) of the rotary actuator, a fixed value is added to the value of the position set-point delivered to the first servocontrol loop starting from the beginning of the crossing of the dead zone and, for decreasing values of the position ($x_r$) of the rotary actuator, the position set-point value again takes its initial value starting from the beginning of the crossing of the dead zone.

The main advantages of the invention are that it makes it possible to use a proportional derivative control and, hence, to obtain short response times by eliminating the effects due to the crossing of the slide through the dead zone.

BRIEF DESCRIPTION OF THE DRAWINGS

Other characteristics and advantages of the invention will emerge with the aid of the description which follows, given with regard to the appended drawings which represent.

DISCUSSION OF THE PREFERRED EMBODIMENTS

The invention is described below with reference to a hydraulic servovalve, but it can of course also be employed for a pneumatic servovalve, by means of modifications which are within the scope of a person skilled in the art upon reading the present description.

Figure 1:
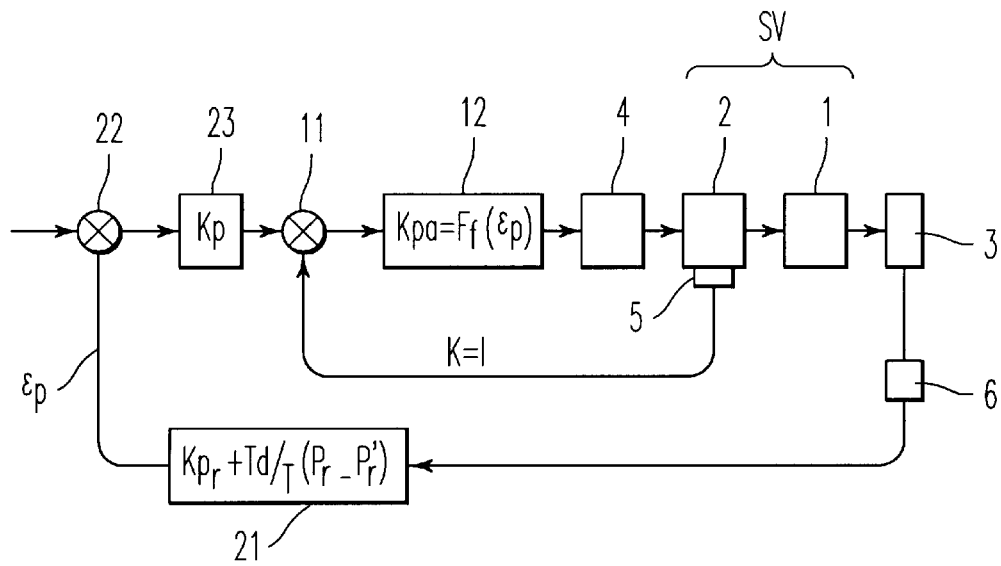
FIG. 1, a schematic diagram of the servocontrol device.

FIG. 1 is a schematic diagram of a servovalve and its servocontrol device. The servovalve itself consists of a hydraulic slide 1, controlled by an electric motor 2 and provided with return devices (not represented). The hydraulic slide 1 controls, for example, the pressurizing or venting to tank of a chamber 3.

The motor is controlled by an electronic control device 4 having pulse width modulation. A position sensor 5 measures the angular position of the motor and a pressure sensor 6 measures the pressure in the chamber 3.

A first servocontrol loop includes a comparator 11, which receives a position set-point value and the actual value of the position delivered by the sensor 5. This comparator 11 delivers a position deviation signal to a proportional control servocontrol circuit 12 which delivers a control signal to the electronic control device 4, via pulse width modulation. This first loop is completed by the motor 2 and the position sensor 5.

This first servocontrol loop is nested within a second servocontrol loop, which comprises a use chamber 3 and a pressure sensor 6 whose output signal is sent to a variable-control servocontrol device 21. The latter delivers a corrected pressure signal to a comparator 22 which additionally receives a pressure set-point value and delivers a pressure deviation signal to an electronic control circuit 23 which delivers a position set-point signal to the comparator 11 of the first loop. This second servocontrol loop also comprises the servocontrol device 12, the electronic circuit 4, the motor 2 and the hydraulic slide 1.

Figure 2:
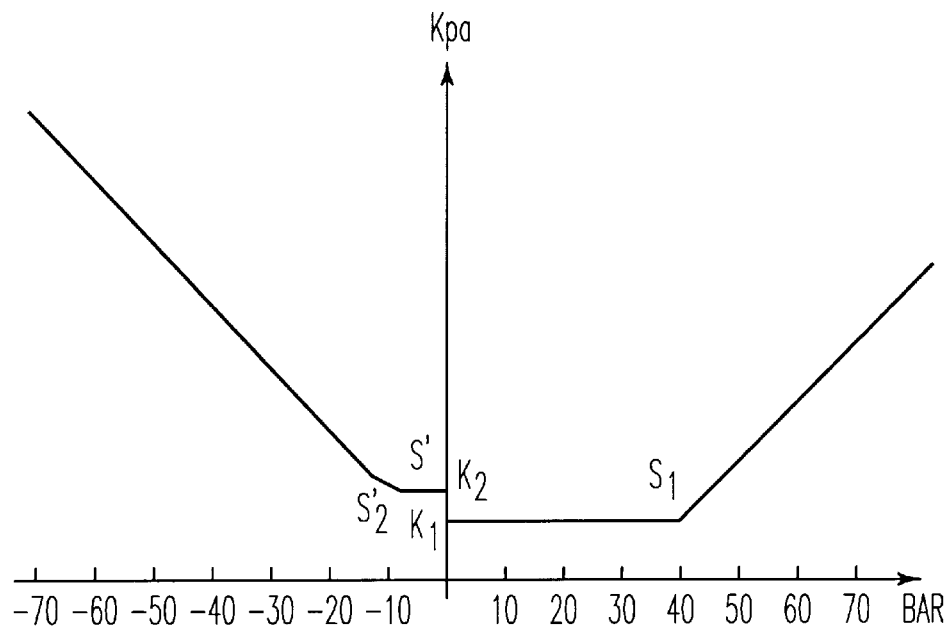
FIG. 2, a curve indicating the various gain values for the first servocontrol loop.

In accordance with the invention, the servocontrol circuit 12 with proportional action delivers a gain value which depends on the value of the pressure deviation signal $\epsilon_p$ delivered by the comparator 22. The control law for the value of the gain is indicated by the curve of FIG. 2 which represents the value of the gain $K_{pa}$ as a function of the value of the pressure deviation $\epsilon_p$ which is equal to the difference between the desired pressure, which may range up to 166 bar for example, and the instantaneous pressure measured by the sensor 6. When the chamber 3 is pressurized, this deviation first has a high value and it then decreases as the pressure stabilizes within the use chamber 3.

When the pressure deviation is less than a certain threshold, in absolute value, the gain is maintained at a constant value. Advantageously, the threshold and the value of the constant gain are different for the positive and negative values of the pressure deviation $\epsilon_p$. For the positive values, the threshold $S_1$ is higher but the value of the gain $K_1$ is less than the value $K_2$ of the gain for the negative values, the threshold $S'_1$ for the negative values being, in absolute value, smaller than the threshold $S_1$ for the positive values.

When the value of the pressure deviation $\epsilon_p$ exceeds, in absolute value, the threshold values indicated above, the value of the gain varies in an increasing manner as a function of the absolute value of the position deviation, according to a linear function in the example represented.

Advantageously, for the negative values of the position deviation, a second threshold $S'_2$ greater than the first threshold $S'_1$ is envisaged and, starting from this threshold value $S'_2$ of the absolute value of the position deviation, the gain varies linearly with a higher slope than for the values lying between the two thresholds $S'_1$ and $S'_2$.

Advantageously, the values of the gain, for one and the same absolute value of the position deviation, are higher for the negative values of the latter than for its positive values.

In an exemplary of an embodiment applied to the pressure servocontrol of a vehicle brake, the positive threshold $S_1$ is equal to 40 bar, the thresholds for the negative values $S'_1$ and $S'_2$ are respectively equal to 8 and 14 bar, the absolute value of the slope of the linear function for the positive values greater than 40 bar is equal to 1; for the negative values lying between 8 and 14 bar in absolute value, the absolute value of the slope of the linear function is equal to 0.5, and for the negative values greater than 14 bar in absolute value, the slope of the linear function is equal to 1 as for the positive values greater than 40 bar.

Figure 3:
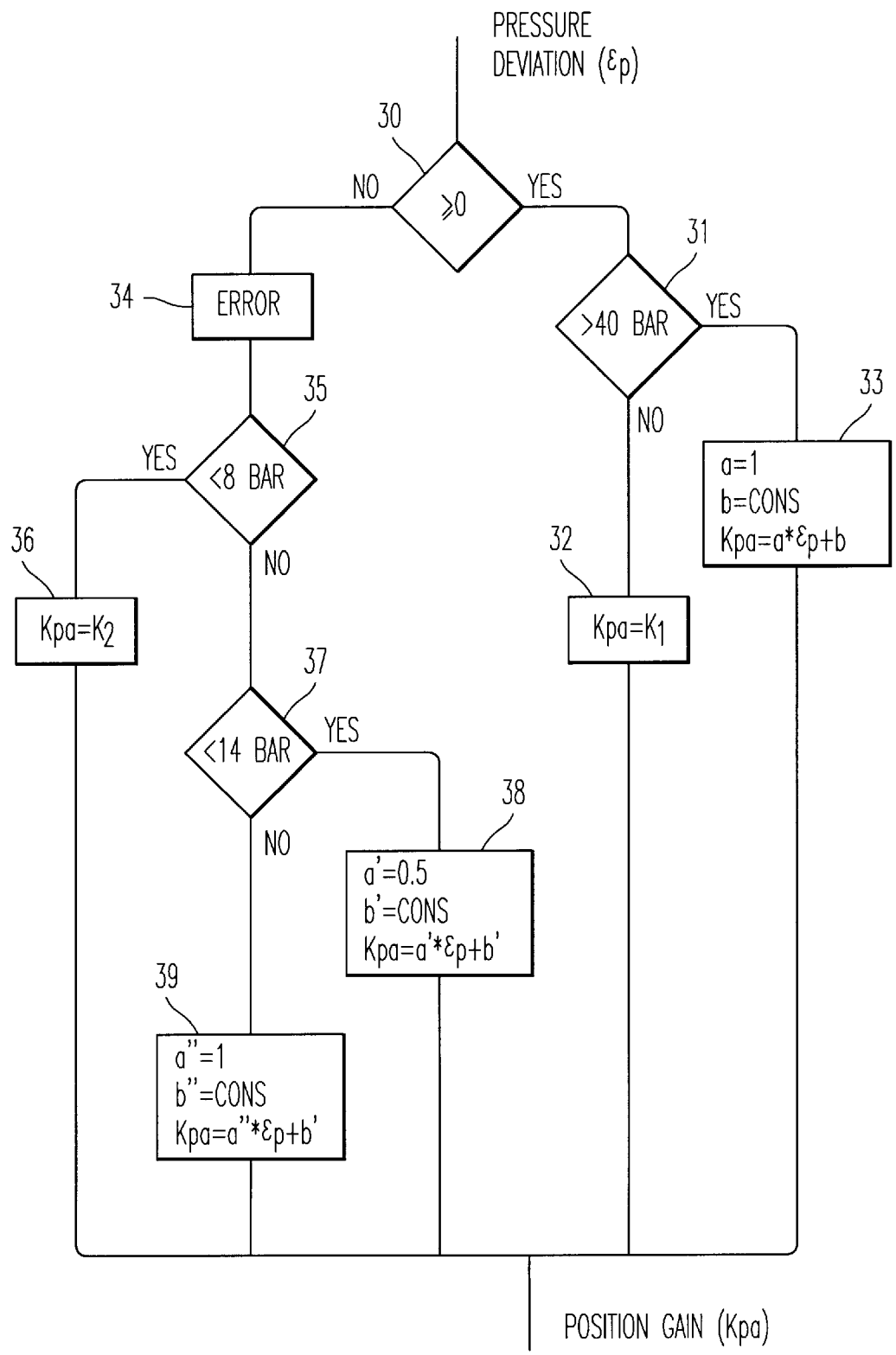
FIG. 3, a flow chart for the control of the first loop.

FIG. 3 represents the computer control flow chart for obtaining this law for varying the gain of the first loop for the servocontrol of the position of the motor.

A first step 30 determines whether the pressure deviation $\epsilon_p$ is positive or negative. In the case where it is positive, the pressure deviation is compared with the first threshold value $S_1$ in a step 31. As long as this deviation is greater than this threshold, the gain is determined according to a linear function in a step 33, the slope of this linear function being equal to 1. When the pressure deviation drops below this threshold value, in step 32 the value of the gain $K_{pa}$ has a constant value $K_1$.

If the pressure deviation signal $\epsilon_p$ is negative, the absolute value is first calculated in a step 34 and then it is compared with the threshold $S'_1$ in a step 35 and when the absolute value of the pressure deviation is less than this threshold value, the gain $K_{pa}$ is fixed at the value $K_2$ in a step 36. In the contrary case, the absolute value of the pressure deviation $\epsilon_p$ is compared with the second threshold $S'_2$ in a step 37. If this absolute value is less than this threshold, in a step 38 a first linear function is determined, the absolute value of whose slope is equal to 0.5 and, in the contrary case, in a step 39, a second linear function of higher slope, the absolute value of which is equal to 1, is determined.

According to another characteristic of the invention, a correction of the dead zone is performed so as to eliminate the time constant introduced by the crossing of the slide through this dead zone. A dead zone value ZM is defined which corresponds to the travel of the slide while the hydraulic link is not established; this dead zone ZM corresponds for example to 0.5 mm for a total travel of the slide of 4 mm.

Figure 4:
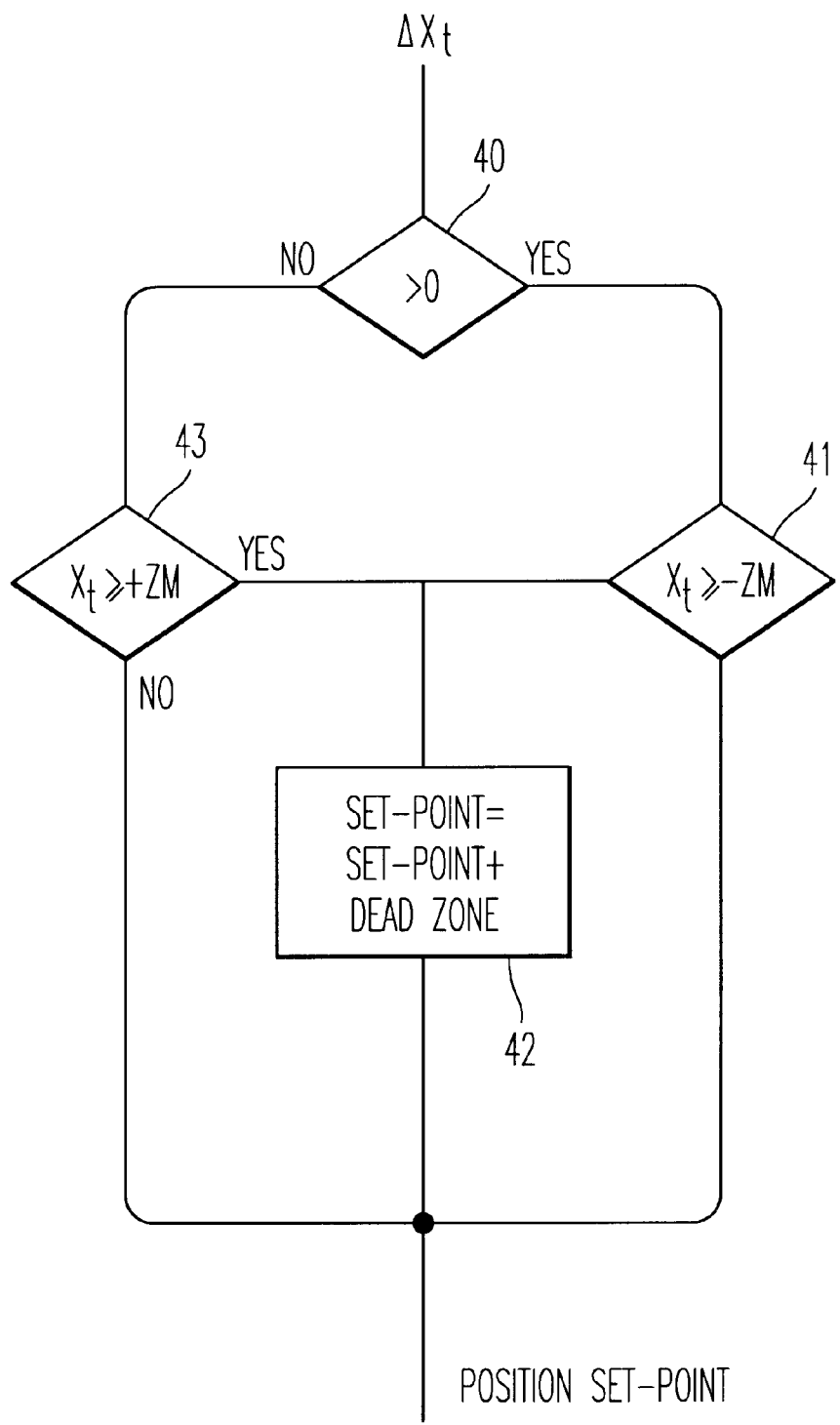
FIG. 4, a flow chart for the control of the second loop.

According to the invention, when the travel of the slide $x_t$ varies in an increasing manner, that is to say in the direction of the position of pressurization of the chamber 3, as soon as the slide enters the dead zone, a constant value, which is preferably equal to the value of the aforementioned dead zone ZM, that is to say 0.5 mm in the example indicated, is added to the position set-point delivered to the comparator 11. This increase in the set-point value is maintained and when the travel of the slide, $x_t$, decreases, that is to say the latter is directed towards the position of venting to tank, as soon as the slide reaches the dead zone, the increase in the position set-point is removed and the latter resumes its normal value. This is illustrated in the flow chart of FIG. 4 which indicates the law for determining the position set-point as a function of the position of the slide or of the position of the motor as delivered by the sensor 5, $x_t$.

In a first step 40, the sign of the variation $\Delta x_t$ of the travel of the slide is determined, each sign corresponding to a direction of translation of the slide. If this variation is positive, it is compared with the value $-ZM$ in a step 41 and if the position $x_t$ is greater than this value, in a step 42, a fixed value corresponding to the dead zone ZM is added to the set-point value computed by the circuit 23.

If the variation in the position delivered by the sensor 5 is negative, it is compared, in a step 43, with a value equal to +ZM and so long as the value of the position $x_t$ is greater than this value, the correction of step 42 is performed.

When the slide has reached the dead zone, that is to say when the position $x_t$ is less than ZM, the position set-point value again takes the value normally computed by the circuit 23.

Figure 5A:
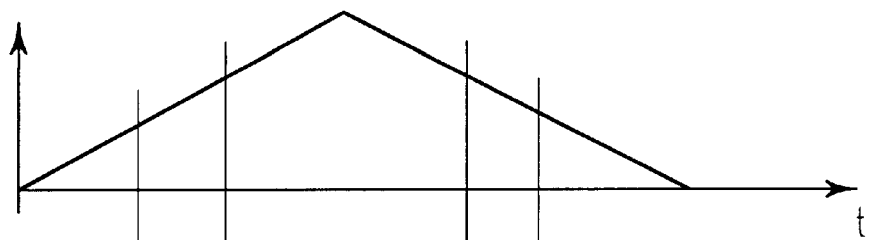
FIG. 5, a series of curves illustrating the control of the second loop.
Figure 5B:
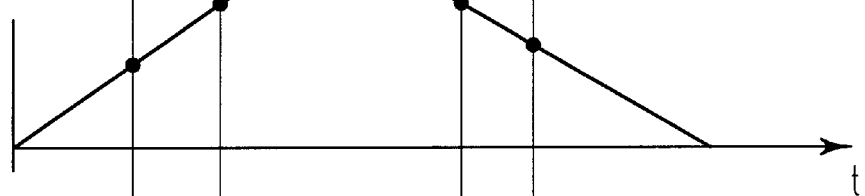
Figure 5C:
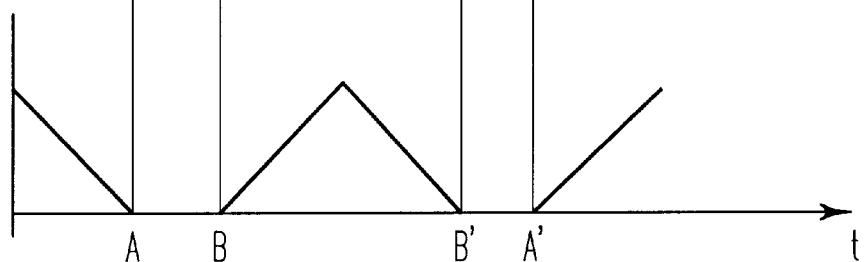
Figure 5D:
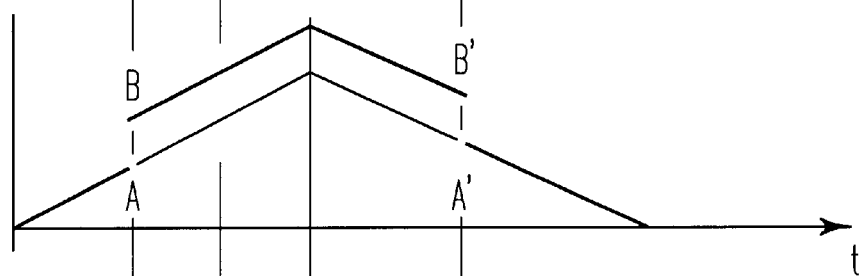
Figure 5E:
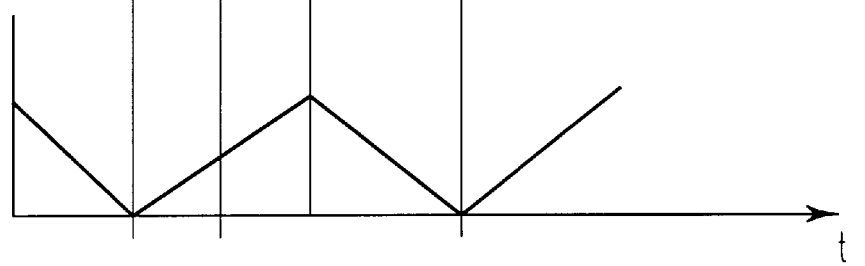

This is illustrated by the curves of FIG. 5a which represent as a function of time t, in the case of curve 5a, the position set-point normally delivered by the circuit 23, in the case of curve 5b, a copy of the position of the motor, in the case of curve 5c, the flow rate of the servovalve without any correction of the dead zone, in the case of curve 5d the correction of the set-point carried out according to the invention and in the case of curve 5e, the flow rate of the servovalve when the correction of the dead zone is performed.

These servocontrol procedures are carried out digitally by a microprocessor located in the device 21 and employing control software for the servovalve.

The servovalve according to the invention can be used with chambers of different volumes. In order to regulate the gain $K_{pa}$, it is merely necessary to determine a base value which is an increasing function of the volume of the use chamber. The software is the same and the curves of FIG. 2 corresponding to different pressures are simply shifted by a fixed value and hence obtained by translation parallel to the gain $K_{pa}$ axis.

We claim:

1. Servocontrol process for a servovalve comprising a slide provided with return means and moved by a rotary actuator, the servocontrol process comprising two nested loops, a first loop for servocontrolling the flow rate as a function of the measurement of the angular position of the rotary actuator and a second servocontrol loop with variable control as a function of a measurement of a pressure, characterized in that the first servocontrol loop is a proportional action loop whose gain is a non-zero value throughout its entire range and is constant for values of the absolute value of a pressure deviation of the measured pressure from a desired pressure which are less than a first threshold value, and then varies in an increasing manner for the values of the absolute value of the pressure deviation which are greater than said first threshold.

2. Process according to claim 1, characterized in that, for a given value of the absolute value of the pressure deviation, the value of the gain of the servocontrol loop is higher for a negative value of the said deviation than for a positive value.

3. Process according to claim 1, characterized in that, when the absolute value of the pressure deviation is greater than said first threshold, the gain varies according to a linear function.

4. Process according to claim 1, characterized in that a second threshold is provided and different ones of said first and second thresholds are provided for negative values of the pressure deviation and for positive values, the threshold being smaller for negative values.

5. Process according to claim 1, characterized in that, for negative values of the pressure deviation, the gain varies according to a first linear function up to a third threshold of the absolute value of the pressure deviation, and then according to a second linear function of larger slope.

6. Process according to claim 5, characterized in that the absolute value of the slope of the second linear function for negative values of the pressure deviation is equal to the slope of the linear function for positive values of the pressure deviation.

7. Process according to claim 1, characterized in that the value of the gain is an increasing function of a capacity of a volume of a chamber whose pressure is to be controlled, a difference between gains for two given volumes being constant as the pressure deviation varies.

8. Servocontrol process according to claim 1, characterized in that, in the case of pressure servocontrol, for increasing values of a position of the rotary actuator, a fixed value is added to the value of the position set-point delivered to the first servocontrol loop starting from the beginning of the crossing of the dead zone and, for decreasing values of the position of the rotary actuator, the position set-point value again takes its initial value starting from the beginning of the crossing of the dead zone.

9. Servocontrol process according to claim 8, characterized in that said fixed value corresponds to the displacement of the slide between a neutral rest position and one of two working positions.

10. Process according to claim 1, characterized in that it is applied to a hydraulic servovalve.

11. Process according to one of claim 1, characterized in that it is applied to a pneumatic servovalve.

12. Process according to claim 2, characterized in that, when the absolute value of the pressure deviation is greater than said first threshold, the gain varies according to a linear function.

13. Process according to claim 2, characterized in that a second threshold is provided and different ones of said first and second thresholds are provided for negative values of the pressure deviation and for positive values, the threshold being smaller for negative values.

14. Process according to claim 3, characterized in that a second threshold is provided and different ones of said first and second thresholds are provided for negative values of the pressure deviation and for positive values, the threshold being smaller for negative values.

15. Process according to claim 2, characterized in that, for negative values of pressure deviation, the gain varies according to a first linear function up to a third threshold of the absolute value of the pressure deviation, and then according to a second linear function of larger slope.

16. Process according to claim 3, characterized in that, for negative values of the pressure deviation, the gain varies according to a first linear function up to a third threshold of the absolute value of the pressure deviation, and then according to a second linear function of larger slope.

17. Process according to claim 4, characterized in that, for negative values of the pressure deviation, the gain varies according to a first linear function up to a third threshold of the absolute value of the pressure deviation, and then according to a second linear function of larger slope.

18. Process according to claim 2, characterized in that the value of the gain is an increasing function of a capacity of the volume of the chamber whose pressure is to be controlled, a difference between gains for two given volumes being constant as the pressure deviation varies.

19. Process according to claim 3, characterized in that the value of the gain is an increasing function of a capacity of a volume of a chamber whose pressure is to be controlled, a difference between gains for two given volumes being constant as the pressure deviation varies.

20. Process according to claim 4, characterized in that the value of the gain is an increasing function of a capacity of a volume of a chamber whose pressure is to be controlled, a difference between gains for two given volumes being constant as the pressure deviation varies.

* * * * *